Figure 1:
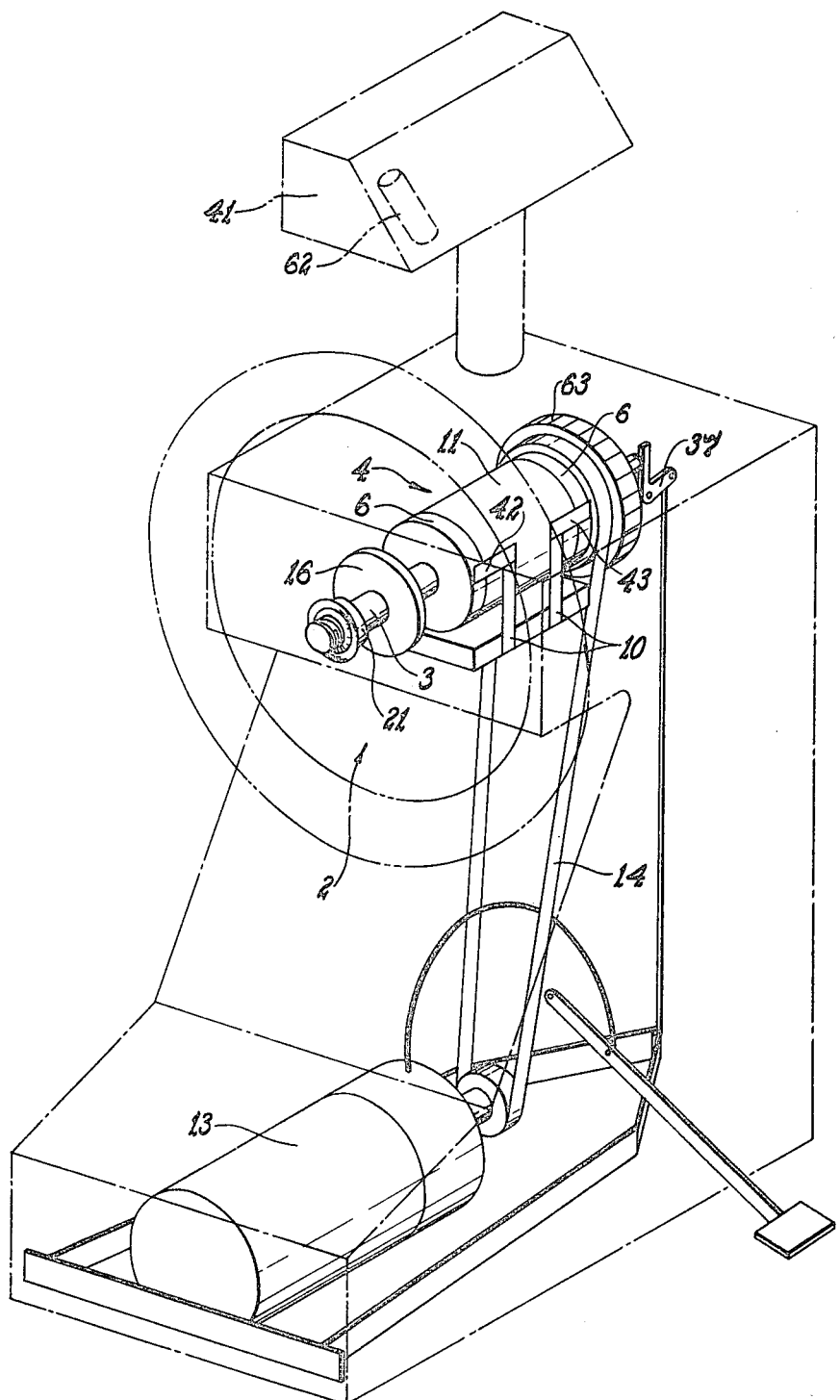

United States Patent
Harant

[15] 3,636,773
[45] Jan. 25, 1972

[54] APPARATUS FOR USE IN BALANCING MOTOR VEHICLE AND OTHER WHEELS

[72] Inventor: Gerhart Wilhelm Harant, Blackburn, Victoria, Australia

[73] Assignee: Repco Research Proprietary Limited, Dandenong, Victoria, Australia

[22] Filed: Sept. 15, 1969

[21] Appl. No.: 857,982

[30] Foreign Application Priority Data

Sept. 17, 1968 Australia...................................43460

[52] U.S. Cl..................................................73/466, 73/475
[51] Int. Cl. ............................................................G01m 1/22
[58] Field of Search.....................73/66, 459, 460, 462–467, 73/471–479

[56] References Cited

UNITED STATES PATENTS 2,731,834  1/1956  Fehr et al..................................73/463

FOREIGN PATENTS OR APPLICATIONS 775,803  5/1957  Great Britain...........................73/475
964,937  7/1964  Great Britain...........................73/471

*Primary Examiner*—James J. Gill
*Attorney*—Woodhams, Blanchard & Flynn

[57]  ABSTRACT

Apparatus for balancing motor vehicle and other wheels and which consists of a combination of mechanical devices and an electrical system for rotating the wheel and a supporting shaft and utilizing the reaction in a plurality of shaft supports for producing an electrical analogue in said system for determining the weight and operative positions of balance weights that require to be fitted in balancing planes in the inner and outer rim portions of the wheel, adjustable mounting means being provided on a free end portion of the shaft so that the inner balancing plane of the wheel is located in substantially the same plane extending transversely of the shaft as that in which the adjacent shaft support and its reaction zone is located, rotation of the wheel and its shaft being predetermined so that the system is high tuned and the resultant signals produced by the dynamic components of the reaction in the shaft support in each said zone are evaluated by said electrical system and utilized to determine during a single wheel testing operation the respective weights of at least two of said balance weights.

6 Claims, 10 Drawing Figures

PATENTED JAN 25 1972
3,636,773
SHEET 1 OF 6
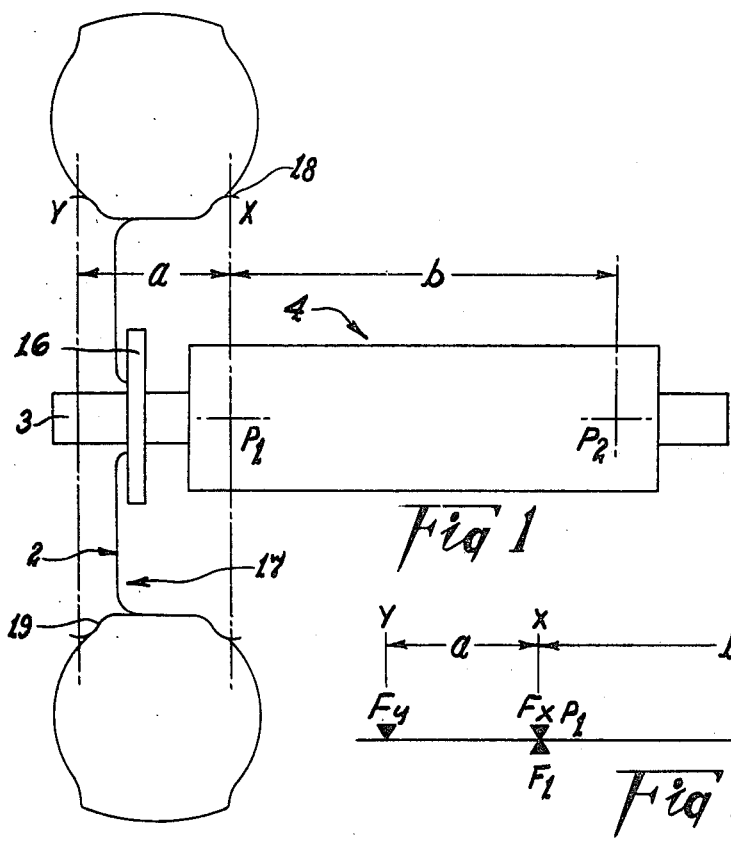
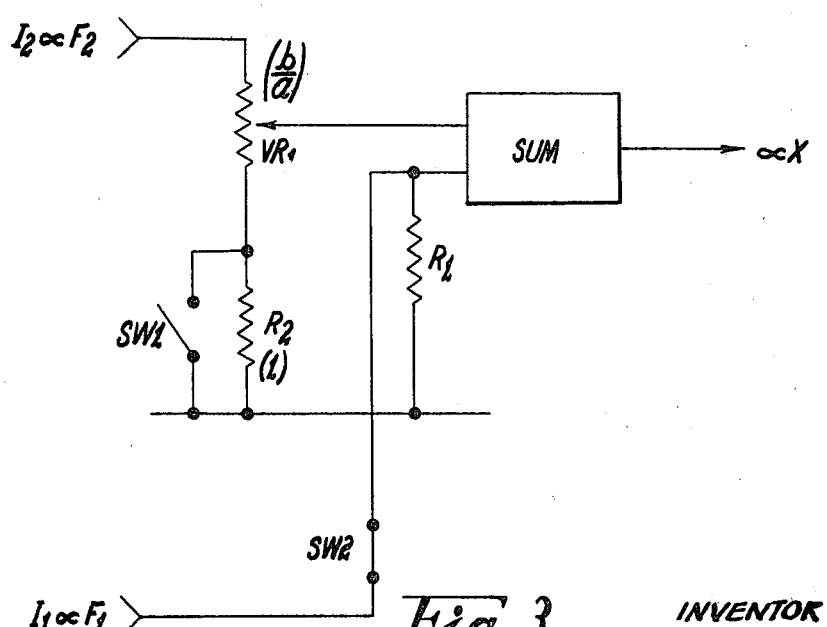
Fig 3
INVENTOR
GERHART WILHELM HARANT
BY
Woodhams, Blanchard & Flynn
ATTORNEYS

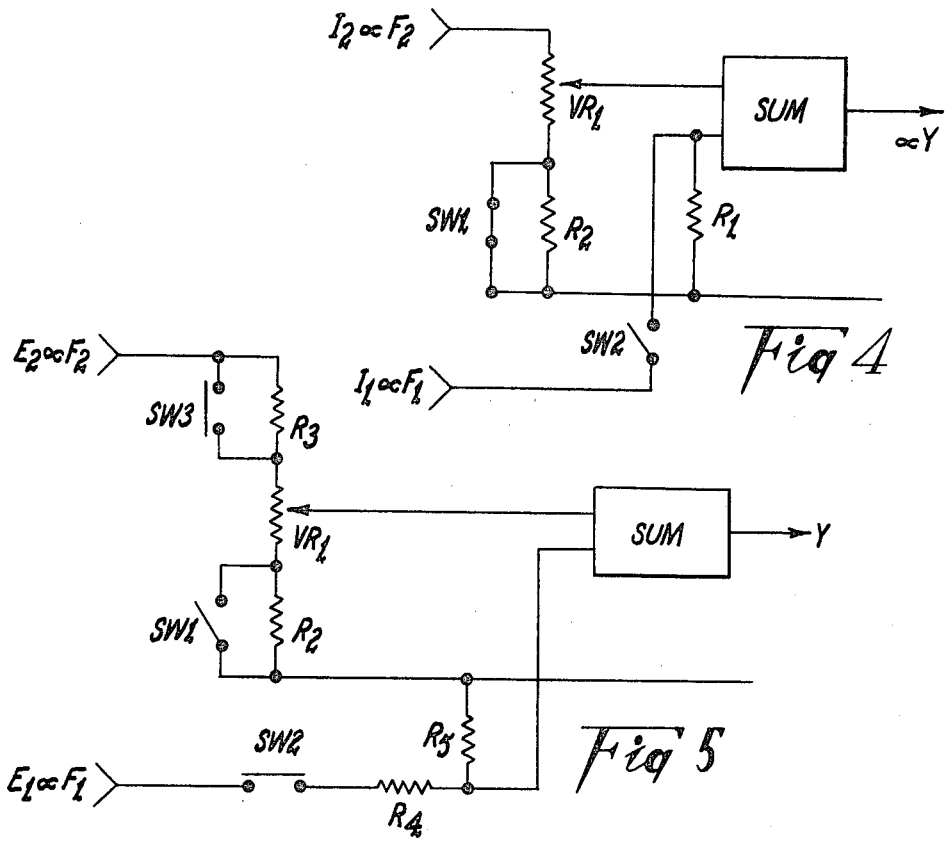
Fig 4
Fig 5
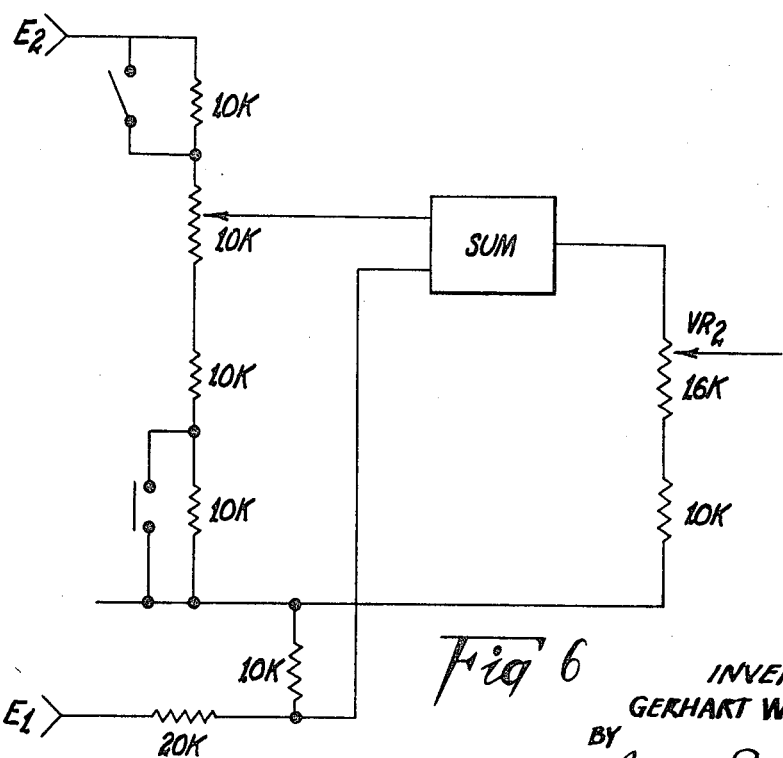
Fig 6

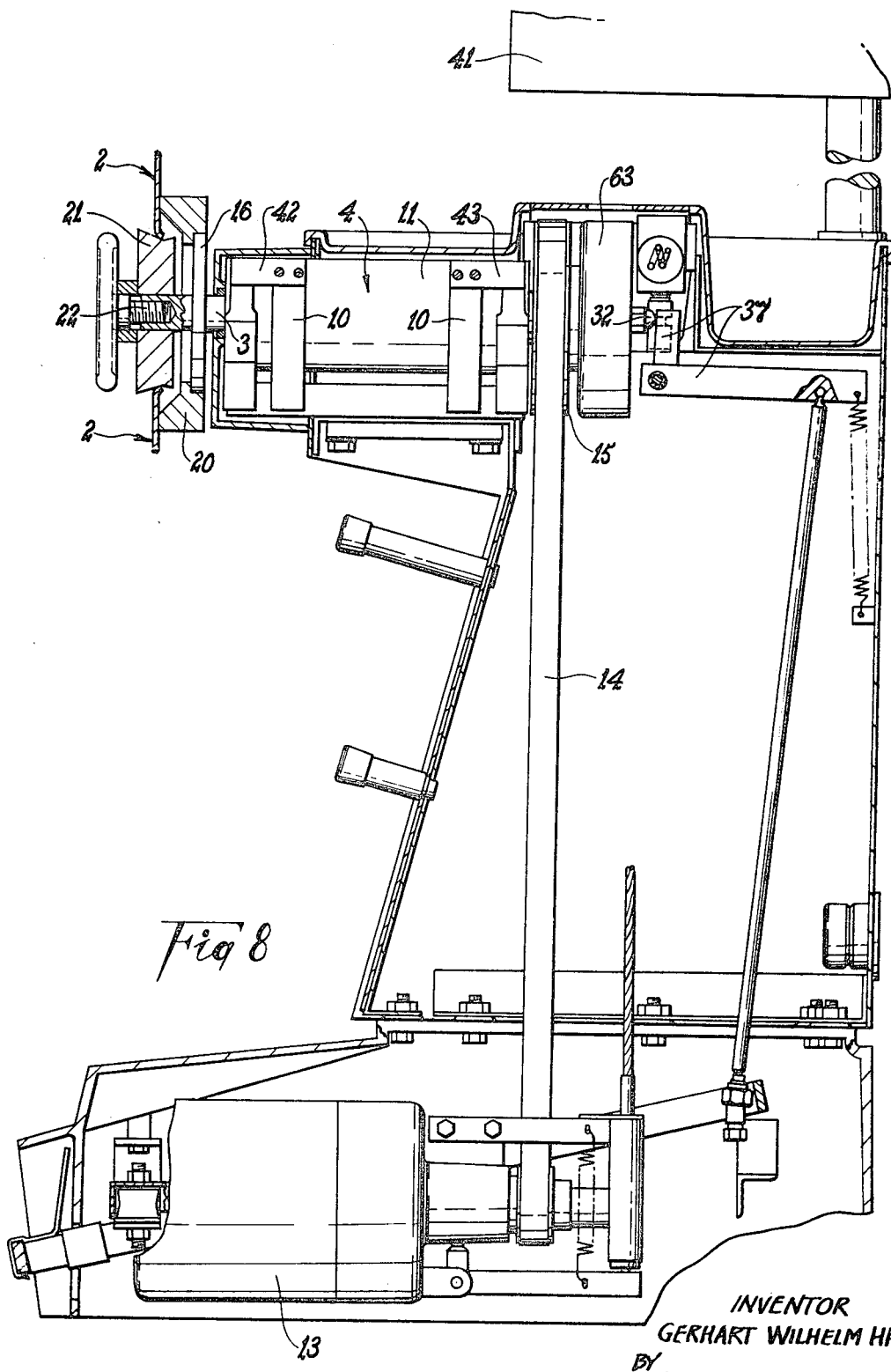

PATENTED JAN 25 1972

3,636,773

SHEET 6 OF 6

INVENTOR
GERHART WILHELM HARANT
BY
Woodhams, Blanchard & Flynn
ATTORNEYS

APPARATUS FOR USE IN BALANCING MOTOR VEHICLE AND OTHER WHEELS

This invention relates to apparatus for use in balancing motor vehicle and other wheels and more particularly concerns that kind of apparatus which comprises a combination of mechanical devices and an electrical system including a rotatable shaft for carrying the unbalanced wheel to be tested and which shaft is adapted during rotation to utilize the reaction in a plurality of zones in which shaft supports are located to produce an electrical analogue in said system for determining the weight and the operative positions of the balance weights that are required to be fitted to the inner and outer rim portions of the vehicle wheel in order to achieve dynamic balance of the wheel about its axis. Such apparatus is hereinafter referred to as being "of the kind indicated."

The dynamic balancing of workpieces can be achieved only by rotating the workpiece. Known apparatus of the kind indicated can be classified into three main groups, which are defined by the relationship of the natural frequency of the system formed by the workpiece and its suspension to the rotating speed of the workpiece being tested. Accordingly, devices which rotate at a speed which exceeds the natural frequency of the balancing system, are referred to as low-tuned devices, others which rotate at the same speed as the natural oscillating frequency are referred to as resonant types, and devices which rotate at a speed which is lower than the natural oscillating frequency of the system are referred to as high tuned.

Known balancing apparatus for use with motor vehicle wheels have in the past been of the first and second types. This mode of operation was chosen because by having a system which is low tuned, the excursion of the vibrating workpiece is of the order of the distance of the mass axis from the rotational axis of the workpiece. In the case of a resonant type apparatus the amount of vibration in the workpiece is limited only by the damping which is inherent in the particular system used. Excursions of this order are quite considerable and can be measured and interpolated by relatively inexpensive means as the signal obtained from the vibrating workpiece is relatively free from noise. On the other hand, such apparatus has the following disadvantages.

1. As the amount of vibration is a function of the distance of the mass axis from the rotational axis of the workpiece, the indication from the indicating system mirrors this relationship and accurate determination of the correction weight is possible only when the mass configuration of the workpiece is known. This is no hardship when the balancing process is carried out on a repetition of similar workpieces; it is, however, a considerable disadvantage in the case of routine motor vehicle wheel balancing where considerable differences exist between wheels fitted to various makes of motor vehicle, and where even within a given wheel, different mass configurations exist due to wear on tires.
2. It is difficult and uneconomic for wheel balancing apparatus of the low-tuned type to be constructed so that the correction weights required in both correction planes can be determined in a single operation. It is normal for such operations to be carried out in stages in such a manner that the correction weights required in one plane are first determined and the correction completed before the balancing in the second plane can be attempted. This process is of necessity time consuming.
3. In order to achieve a low-resonance point the spring rate of the suspension has to be low. The flexible system thus created is very prone to be affected by any outside disturbances such as the application of the driving means to the workpiece. It is therefore generally necessary to remove the driving means from the workpiece before a reading can be taken. This, apart from slowing down the process, causes mechanical complications in the construction of the apparatus which are costly to overcome.
4. Resonance type apparatus have similar disadvantages to low-tuned apparatus with the additional disadvantage that the workpiece has to be speeded up beyond the point of resonance and then allowed to slow down so that the system passes through the resonance speed. This process is extremely time consuming.

The high-tuned method of operation has the obvious advantage that as the excursion of the system is small, only the forces existing in the system are measured. In other words, the reaction against the workpiece supporting means is proportional to the amount of unbalance which is present in the workpiece and is quite independent of the mass of the workpiece itself. In the case of a motor car wheel, where both the mass and the mass configuration of the wheel are not known, this is of great advantage. On the other hand there are disadvantages connected with the use of the usual high-tuned system. Firstly, in the case of a two plane balancing machine, four parameters have to be preset by the operator before the balancing operation can start. Secondly, the signals derived from the machine are small and likely to be highly contaminated by noise.

The primary object of the present invention is to provide improved apparatus of the kind indicated which is adapted to function on a high-tuned system designed to avoid, or at least minimize, the aforesaid disadvantages.

The improved apparatus includes a mechanical section adapted to provide an electrical analogue of such simplicity that the only parameters that have to be taken into consideration by the operator in order to carry out an accurate balancing operation are those which are readily determinable, namely the diameter of the wheel rim and its width.

Other objects of the invention are concerned with the reduction of noise interference in the signals provided by the apparatus when in use and also with means for coping with the various configurations of wheels including those where the wheel center is closed so that a shaft cannot pass through it.

Figure 9:
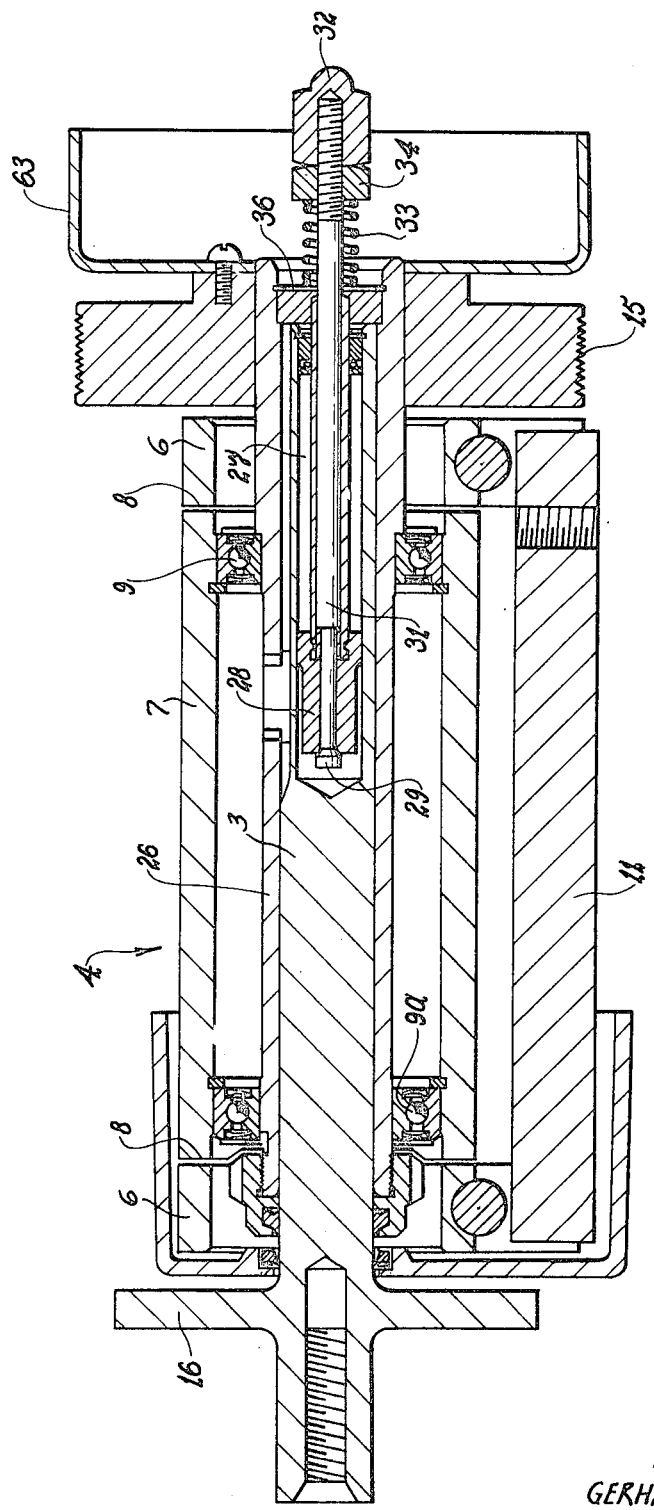
Figure 10:
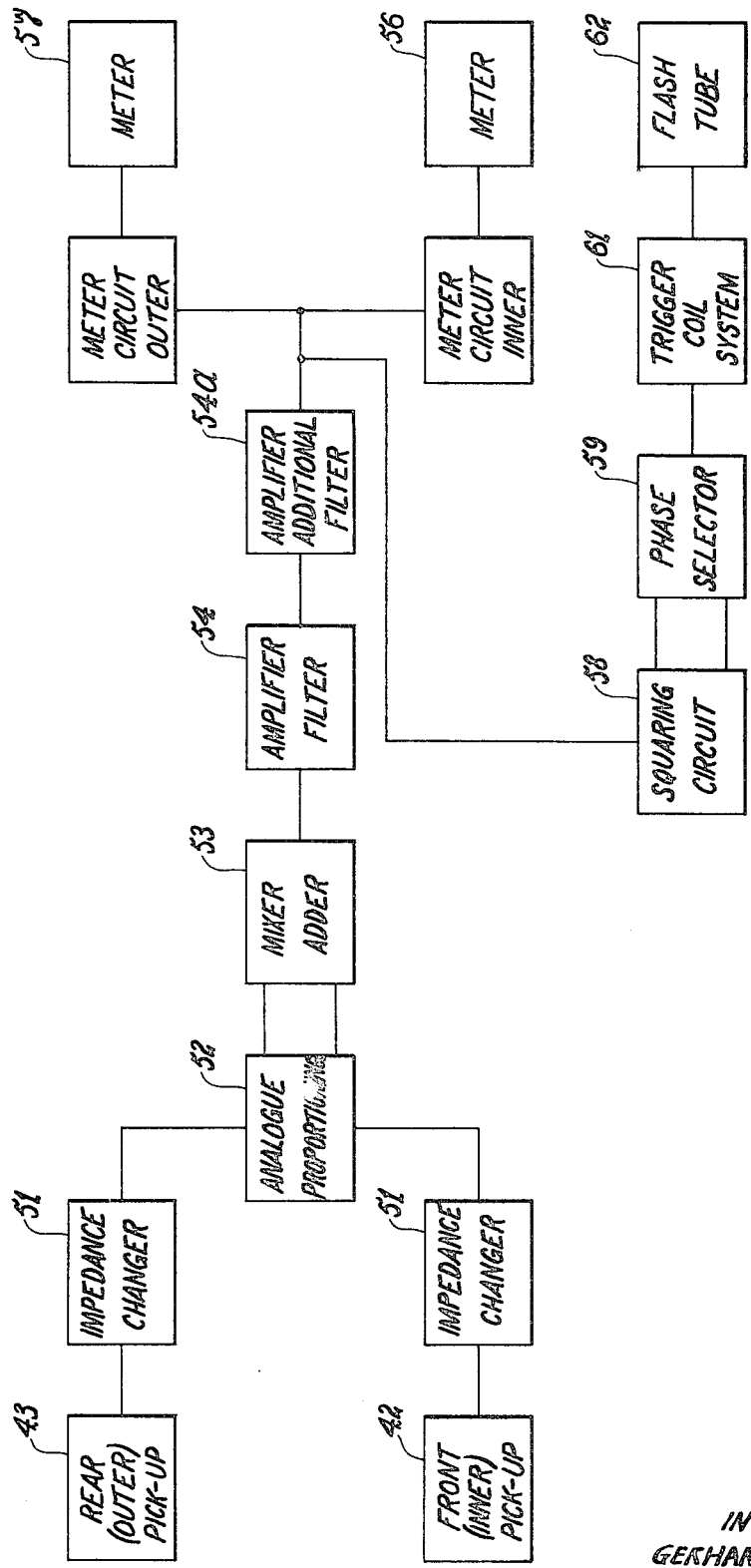

Referring to the accompanying drawings:

FIG. 1 is a semidiagrammatic side elevation of part of the mechanical section of the apparatus for supporting the wheel being tested, FIG. 2 is a diagram indicating the forces taken into consideration when the apparatus shown in FIG. 1 is in use, FIG. 3 is a diagram of part of the associated electronic system in accordance with one embodiment for determining the value of the force Fx shown in FIG. 2 in terms of current variations, FIG. 4 is a similar view to FIG. 3 showing an altered switching arrangement for determining the value of the force Fy seen in FIG. 2, FIG. 5 is a diagram showing part of an electronic system in accordance with a modification in which the values of Fx and Fy shown in FIG. 2 are determined by voltage variations as distinct from current variations, FIG. 6 is a diagram of part of an electronic system in accordance with a practical embodiment as employed for an actual wheel balancing operation, FIG. 7 is a semidiagrammatic perspective view of the improved apparatus, FIG. 8 is a part sectional side elevation of the apparatus seen in FIG. 7, parts being omitted for convenience of illustration, FIG. 9 is a sectional elevation on an enlarged scale showing a telescopic wheel supporting rotatable shaft and parts associated therewith; and FIG. 10 is a block diagram of the related electrical system in accordance with one practical embodiment of the invention.

It is well known in the art to which this invention relates that any unbalance for example, in a rotating motor vehicle or like wheel may be resolved into two arbitrary planes known as the balancing planes and which coincide substantially with the inner and outer rim portions of the wheel. These planes are hereinafter referred to as the "inner" and "outer" balancing planes and have been designated X and Y respectively.

Furthermore, it is an equally well known fact that the amount of force exerted by an eccentric mass such as an unbalance on a rotating shaft is proportional to said mass and its distance from the shaft axis. Such a rotating force creates moments which can be resolved at two reaction zones into radial forces acting in one plane. For example, the two reaction zones are spaced lengthwise of the shaft and one of them is located in substantially the same plane which extends transversely of the shaft axis, in which the inner balancing plane of the wheel being tested is also located. Such an arrangement is shown in FIGS. 1 and 2 and it will be appreciated that in such a rigid system, a simple force diagram as shown in FIG. 2 represents a true analogue of the system at any one instant in time.

Such a geometric arrangement may be used to create an electrical analogue to feed information to a common indicating system for both balancing planes X and Y in such a manner that the amount and location of the imbalance present in each balancing plane may be accurately determined.

The basic mechanical system used in the improved apparatus is shown in FIG. 1 in which a wheel 2 is removably mounted upon a rotatable shaft 3 which is supported in the two reaction zones $P_1$ and $P_2$. The two balancing planes are represented by the letters X and Y and it will be noted that the inner balancing plane X is substantially coplanar with the reaction zone $P_1$.

From the diagram shown in FIG. 2 the following expressions 1 and 2 are derived:

EXPRESSION 1

$$F_2 = -FY(a/b)$$
$$FY = -F_2(b/a)$$
$$F_1 = FX + FY(a+b/b) = FX + FY(1+a/b)$$
$$FX = F_1 - FY(1+a/b)$$

EXPRESSION 2 1

Substituting $FY$ from Expression No. 1.

$$FX = F1 - \left[ -F2\left(\frac{b}{a}\right)\left(1+\frac{a}{b}\right) \right]$$
$$= F1 + F2\left(\frac{b}{a} + \frac{ba}{ab}\right)$$
$$= F1 + F2\left(\frac{b}{a} + 1\right)$$

It will be noted that the forces acting in the balancing planes Y and X respectively due to the unbalance of the wheel being tested, have been expressed in terms of $F_1$ and $F_2$ in the reaction zones $P_1$ and $P_2$. The expressions derived for forces $FY$ and $FX$ contain, as a multiplier for $F_2$ the terms $b/a$ and $$\left(\frac{b}{a}+1\right)$$

respectively.

FIG. 3 shows an electrical analogue circuit arrangement adapted to derive a signal proportional to the force $FY$ from two signals of currents $I_1$ and $I_2$ which are proportional to the reaction forces $f1$ and $F2$ present in the zones $P_1$ and $P_2$ respectively. These signals are used to generate voltages in resistors and such voltages are summed in a voltage summing circuit as shown for example, in FIG. 3.

It should be noted that in order to generate a signal which is proportional to force $FX$, two signals are mixed which are generated in the following manner. Firstly, current $I_1$ is used to generate a voltage in resistor $R_1$ and this voltage is fed to the summing circuit. Secondly, signal $I_2$ is fed to a network consisting of a potentiometer or variable resistance $VR_1$ which is representative of the term $b/a$ in the expression $$F_2 \quad \left(\frac{b}{a}+1\right)$$

and the resistor $R_2$ which is proportioned to represent the value 1 in the above expression. FIG. 4 shows how, by operating for example, the two switches SW1 and SW2 shown in FIG. 3, a signal may be generated which is proportional to force $FY$. It should be noted that in this case the term $b/a$ is represented as aforesaid, but R2 is short circuited and the signal $I_1$ is disconnected from the circuit. Consequently, this circuit is adapted to provide an electrical analogue of the expression $FY = F_2(b/a)$, but with the minus sign omitted. Thus, the analogue is 180° out of phase and therefore the associated indicating system should be adapted to invert the relevant signal in order to arrive at a correct analogue. This correction however, concerns only the indication of the unbalance position and not its amplitude.

As previously mentioned the signals employed in the previous embodiment are related to the current flow in the circuit. A more practical electrical analogue is obtainable by means of the modified circuit arrangement shown in FIG. 5 in which voltages are employed which are proportional to the reactions at the aforesaid zones $P_1$ and $P_2$. In this embodiment a further switch S3 has been included which is associated with a resistor $R_3$ having a resistance equal to resistor $R_2$ in order to preserve a constant resistance condition in the circuit. All of the switches shown are preferably ganged together.

It will be noted that a voltage dividing network consisting of resistances $R_4$ and $R_5$ has replaced the resistances $R_1$ in the signal circuit representative of reaction $F_1$. The relationship of the several resistors in this circuit arrangement depends upon the actual physical parameters of the mechanical balancing apparatus. As the range of the expression $b/a$ is limited in practice, it is preferable to replace the variable resistance $VR_1$ by a potentiometer in series with a fixed resistor at the return end.

In the practical example shown in FIG. 6 of the drawings the following factors are applicable:

Diameter of wheel 10 to 16 inches
$a = 4$ to 8 inches
$b = 8$ inches $$\therefore \frac{b}{a} < 2 > 1$$

FIG. 6 also shows that part of the related circuit arrangement which includes the variable resistance VR2 and the potentiometer 10K which are adapted to compensate for the varying diameters at which the balance weights are operatively secured and which are determined by the wheel rim dimensions. In practice the variable resistances $VR_1$ and $VR_2$ are preferably calibrated in terms of the width and diameter of the wheel rim respectively.

In accordance with a preferred embodiment of the invention as seen in FIGS. 7, 8 and 9, the rotatable shaft 3 passes through a cylindrical housing 4, which forms part of the aforesaid shaft supporting means. The end portions 6 of the housing are partially separated from the central or main body portion 7 by a plurality of arcuate slots 8 adapted to form a flexible or gimball-like connection between each of said end portions and the central body portion of the housing. Longitudinally spaced bearings 9 are accommodated within the central body portion, so that relative lateral movement may occur between the end portions of the housing and a stationary base structure 11 as a result of vibrations that develop during rotation of the shaft within its housing.

The housing may be supported upon a plurality of arms 10 which are preferably connected to the opposite sides of each of the end portions 6 of the housing and at opposite ends to the base structure 11.

Suitable means are provided for rotating the shaft and a wheel carried thereby at any predetermined speed. For example, an electric motor 13 may be mounted upon the base structure and be connected by a driving belt 14 or any other suitable driving means with a pulley 15 on the shaft 3 adjacent to one end, preferably that end remote from the wheel mounting means.

Such mounting means may include a disclike flange 16 fixed to the shaft and appropriately spaced from the adjacent bearing 9a so that when the wheel 3 is mounted on the shaft adjacent to the disc, the latter is accommodated within the dished central portion 17 that is usually provided at the rear of a motor vehicle or like wheel, thus enabling the inner balancing plane of the wheel to be brought into substantial alignment with the adjacent reaction zone in which the adjacent shaft support is located.

Any suitable means are provided for removably mounting the wheel to be tested on the shaft 3 and such means may include a stepped collar 20 engageable with the aforesaid disc 17 and a displaceable cone or the like 21 which is slidable lengthwise on the shaft and adapted for mounting thereon at that side of the wheel opposite to the stepped collar so that the wall of the wheel may be wedged between these two parts. Inward movement of the cone on the shaft may be effected by a manually operable screw 22 fitting within an axial screwed hole in the adjacent end portion of the shaft. The nose of the cone may be provided with a parallel or tapered section to simplify assembly of the wheel and cone on the shaft.

Any suitable type of foot pedal or manually operable means is provided for actuating the electrical motor and thus rotating the wheel shaft in accordance with requirements.

In order to ensure that the inner balancing plane of the wheel may be accurately positioned in substantially the same plane as that of the adjacent reaction zone, provision is made for moving the wheel being tested longitudinally of the shaft axis. For this purpose, the shaft 3 may be telescopically mounted within a sleeve 26 extending lengthwise of its housing and be provided with retaining means for holding the shaft in any desired adjusted position within its sleeve.

For example, the shaft 3 may be provided with a longitudinal bore 27 at that end remote from the wheel supporting disc and have a split collet 28 located within the bore with a spring influenced cone 29 associated therewith for expanding the collet so as to retain the shaft in the desired operative position relative to its sleeve. For example, the cone 29 may be carried by a longitudinally slidable rod 31 extending beyond the adjacent end of the shaft and its sleeve and being fitted at its outer end with a button or the like 32. This rod may also be encircled by a spring 33 extending between a nut 34 or other shoulder on the rod and a fixed end wall 36 on the sleeve. The button may be engageable for example, by a bell crank lever 37 on the supporting base frame 11 and which is actuated by linkage connected to the aforesaid foot pedal or pivoted handle.

If desired, an adjustable locater having an associated scale, may be mounted for example, on the base structure so that the inner balancing plane of the wheel to be tested may be brought into engagement with the locater and thus ensure that the wheel is secured in the correct operative position on its shaft.

The aforesaid circuit arrangements may be incorporated in a separate electronic unit 41 mounted for example, in a box structure located adjacent to the wheel being tested.

The aforesaid operative connections between the mechanical and electrical sections of the apparatus includes two transducers or pick ups 42 and 43 each of which is associated with the shaft support in one of the reaction zones. For example, the two transducers may be connected to or form part of the supporting arms 10 which are connected to the opposite end portions 6 of the shaft housing.

According to a preferred embodiment, this electronic unit 41 includes an impedance changer 51 associated with each of the two transducers. One of these which is associated with the shaft support adjacent to the wheel being tested may be hereinafter referred to as the inner pick up 42, while the other may be hereinafter referred to as the outer pick up 43.

These two impedance changers 51 are adapted to feed their signals to an analogue proportioning means 52 which in turn preferably has a mixer unit 53 and one or more amplifiers 54 associated therewith. These amplifiers in turn feed their signals to two meters 56 and 57 one for each of the inner and outer balancing planes.

In addition, the amplifiers preferably feed their signals through a squaring circuit 58, a phase selector 59 and a trigger coil system 61, to a stroboscopic or like flash tube 62 associated with a rotatable chart 63 carried by the rotatable shaft.

The arrangement is such that signals received from the transducers 42, 43 are passed into two separate preamplifier stages of the circuitry which function to change the impedance to a relatively low value without materially altering the amplitude of the signal. This may be achieved for example, by means of two field effect transistor integrated circuits.

The two signals so derived are fed to the aforesaid analogue proportioning means 52 which provides an electrical analogue of the expressions derived from the circuits previously described with reference to FIGS. 3 to 6 of the drawings. From the proportioning unit, the signals are passed to the mixer unit 53 in which the algebraic sum of the signals is derived. The output from the mixer unit may be passed on to an attenuator in which the signal amplitude is varied to represent the wheel diameter through the medium of a second potentiometer or the like.

After passing through an associated amplifier 54 which may include a low-pass filter, the signal is preferably fed to a second amplifier 54a which may include a parallel "T" or similar filter tunable over a narrow range of frequencies. The tuning control acts as a phase shift network so as to enable the flash produced by the aforesaid tube 62 to be made coincident with the unbalanced position of the wheel.

The output from this stage of the electrical network is employed to carry out two functions. For example, it is fed through suitable switches to rectifiers which are in turn employed to charge a capacitor, the voltage across the latter being read by an electrometer type circuit and displayed on the aforesaid meters 56, 57 which are adapted to indicate the mass required for fitting to the inner and outer balancing planes to balance the wheel. This enables the readings to be retained in a known manner after the rotation of the shaft and its wheel has ceased.

The switches alternatively selecting the meters 56 and 57, those selecting the phase to be fed into the trigger system 61, and those selecting the configuration of the analogue network of FIG. 3, are all adapted to be operated to select the readings for either of the aforesaid inner or outer planes, and are therefore preferably ganged together.

The second function carried out by the signal derived from the amplifier stage is to trigger the flash tube 62. This is effected firstly by accurately squaring the signal in suitable circuitry and then depending upon which unbalance plane is under observation, selecting the suitable phase to be fed to the trigger system 61, which is adapted to create a pulse employed for actuating the associated stroboscopic flash tube or the like 62.

The markings on the associated rotary chart 63 are related to circumferentially spaced positions on the rim portion of the wheel being tested. Thus, the readings provided by the flashing tube during rotation of the wheel indicate the positions on the inner and outer balancing planes of the wheel rim at which balance weights of predetermined mass should be fitted.

It will be appreciated from the foregoing that the improved apparatus is adapted to determine in a single operation, both the weight and operative positions of the balance weights required to balance a motor vehicle or other wheel.

The majority of motor vehicle and like wheels of the dished type as aforesaid also include an axial hole through which the adjacent end portion of the rotatable shaft may pass while the wheel is being tested. Other known types of wheels however, are devoid of such an axial hole and in such cases the aforesaid telescopic formation of the shaft enables it to be adjusted lengthwise relative to the wheel, so as to enable the latter to be correctly positioned on the shaft without the latter having to pass through the wheel.

In addition, the telescopic formation of the shaft simplifies the operation of coaligning the inner balancing plane of the wheel being tested with that of the adjacent reaction zone when the wheel is being fitted to the rotatable shaft.

Various alterations, modifications and/or additions may be introduced into the foregoing construction and arrangement of parts without departing from the ambit of the invention as defined by the appended claims.

1. Apparatus for detecting unbalance in motor vehicle and other wheels, comprising a rotatable shaft, means for resiliently supporting said shaft in two reaction zones which are spaced lengthwise of the shaft so that a free end portion of the shaft projects beyond one of said reaction zones, means for mounting an unbalance wheel to be tested on the free end portion of said shaft, transducer means located in each said zone for sensing motion of said support means, electrical circuitry means associated with said transducer means for producing an electrical analogue by vibrations to which the shaft is subjected during rotation of the unbalanced wheel and for using said electrical analogue to determine the magnitude and operative positions of balance weights that may require to be fitted in inner and outer balancing planes coinciding substantially with the inner and outer rim portions of the wheel being tested, means for effecting relative movement between said wheel mounting means and said shaft and said reaction zones so that the inner balancing plane of the wheel may be located in substantially the same plane extending transversely of the shaft axis as that of the adjacent reaction zone, means for rotating the shaft at a predetermined speed which is lower than the natural oscillating frequency of the shaft and its supporting means so that the system is high tuned, and operative connections including said transducer means extending between the shaft supporting means in each said zone and said electrical circuitry means, whereby during rotation of the shaft and the wheel carried thereby, the resultant signals produced by the dynamic components of the reaction in the shaft support means in each said zone are evaluated by said electrical circuitry means and utilized to determine during a single wheel testing operation, the respective magnitude of at least two balance weights that may require to be fitted respectively to the inner and outer rim portions of said wheel to balance the same.

2. Apparatus according to claim 1, wherein said shaft supporting means includes a main body member and opposite end portions which are partially separated from and flexibly connected to said main body member, a rigid base structure on which each of said opposite end portions is mounted, said main body member being provided with bearings for said shaft.

3. Apparatus according to claim 1, wherein said shaft is mounted in a housing having a main body member and opposite end portions which are partially separated from and flexibly connected to said main body member, a rigid base structure on which each of said opposite end portions is mounted, said main body member being provided with bearings for said shaft, one of said transducer means being connected to each of the opposite end portions of said housing.

4. Apparatus according to claim 1, wherein said electrical circuitry means also includes means adapted to be influenced by said signals for visually indicating the operative positions of the balance weights that may be required to be fitted on the inner and outer balancing planes of said wheel.

5. Apparatus according to claim 1, wherein said shaft is of telescopic construction including a sleeve in which a main shaft carrying the wheel mounting means is slidable lengthwise, means for retaining said main shaft in the desired operative position after adjustment within its sleeve and means for releasing said retaining means in accordance with requirements.

6. Apparatus for detecting unbalance in motor vehicle and other wheels, comprising a rotatable shaft, means for resiliently supporting said shaft in two reaction zones which are spaced lengthwise of the shaft so that a free end portion of the shaft projects beyond one of said reaction zones, means for mounting an unbalanced wheel to be tested on the free end portion of said shaft, transducer means located in each said zone for sensing motion of said support means, electrical circuitry means associated with said transducer means for producing an electrical analogue by vibrations to which the shaft is subjected during rotation of the unbalanced wheel and for using said electrical analogue to determine the weight and operative positions of balance weights that may require to be fitted in inner and outer balancing planes coinciding substantially with the inner and outer rim portions of the wheel being tested, means for effecting relative movement between said wheel mounting means and said shaft and said reaction zones so that the inner balancing plane of the wheel may be located in substantially the same plane extending transversely of the shaft axis as that of the adjacent reaction zone, means for rotating the shaft at a predetermined speed which is lower than the natural oscillating frequency of the shaft and its supporting means so that the system is high tuned, and operative connections including said transducer means extending between the supporting means in each said zone and said electrical circuitry means, said transducer means and the associated electrical circuitry means being adapted to convert the dynamic components of the forces acting on said shaft supporting means while said wheel is rotating into two electrical signals of amplitude and phase representative of the magnitude and direction of such forces, said electrical circuitry means including processing means for the evaluation of said signals, said processing means including voltage divider means for evaluating the imbalance in the outer balancing plane, said voltage divider means being electrically connected to the transducer means associated with the shaft supporting means in the reaction zone remote from said wheel and being adjustable to such a setting as is representative of the ratio of the distance between the two reaction zones and the distance between the inner and outer balancing planes of said wheel, said processing means also being adapted to enable evaluation of the imbalance in the wheel as referred to its inner balancing plane to be determined by electrical summing means, whereby a proportion of the signal derived from the shaft supporting means in the adjacent reaction zone is summed with a signal derived from the shaft supporting means in the remote reaction zone and which is processed in an electrical network including said voltage divider means, while still adjusted at said setting, said resultant signal being representative of the imbalance related to the inner balancing plane of said wheel.

* * * * *